United States Patent [19]
Lawson et al.

[11] Patent Number: 5,320,298
[45] Date of Patent: Jun. 14, 1994

[54] UNDIRECTIONAL RATCHET UTILIZING AN ARTICULATED PAWL

[75] Inventors: Robert M. Lawson; Robert E. Kraft, both of Santa Clara, Calif.

[73] Assignee: Hewlett-Packard Company, Palo Alto, Calif.

[21] Appl. No.: 819,538

[22] Filed: Jan. 10, 1992

[51] Int. Cl.⁵ .............................. B65H 18/12
[52] U.S. Cl. ................................ 242/67.1 R
[58] Field of Search .............. 242/67.1 R; 254/369, 254/352, 353, 306, 307, 217, 218; 74/577 M, 577 R, 25; 400/236.1

[56] References Cited

U.S. PATENT DOCUMENTS

| | | | |
|---|---|---|---|
| 870,307 | 11/1907 | McCool | 400/236.1 X |
| 1,079,700 | 11/1913 | Gibson | 254/218 |
| 1,366,885 | 1/1921 | Ness | 254/307 |
| 1,445,430 | 2/1923 | Dardani | 254/353 X |
| 3,581,586 | 6/1971 | Blackburn | 254/369 X |
| 3,944,162 | 3/1976 | Henderson | 242/107.4 A |
| 3,985,314 | 10/1976 | Booth | 242/107.4 A |
| 4,260,271 | 4/1981 | Kondur | 400/236.1 X |

Primary Examiner—John M. Jillions
Attorney, Agent, or Firm—Howard R. Boyle

[57] ABSTRACT

The invention is embodied in an articulated pawl. This pawl is designed to reliably drive a take-up reel on a tape and reel component feeder. By always engaging teeth on the reel, the pawl is prevented from skipping teeth during the return phase of the reel drive cycle. The addition of an articulated arm on the pawl prevents the pawl from skipping teeth on the reel during the drive phase of the reel drive cycle. The articulated arm ensures that either the tooth on the base of the pawl or the tooth on the articulated arm engages a tooth, or both engage teeth, on the reel during the drive phase. This invention ensures the positive and repeatable rotation of the take-up reel.

1 Claim, 10 Drawing Sheets

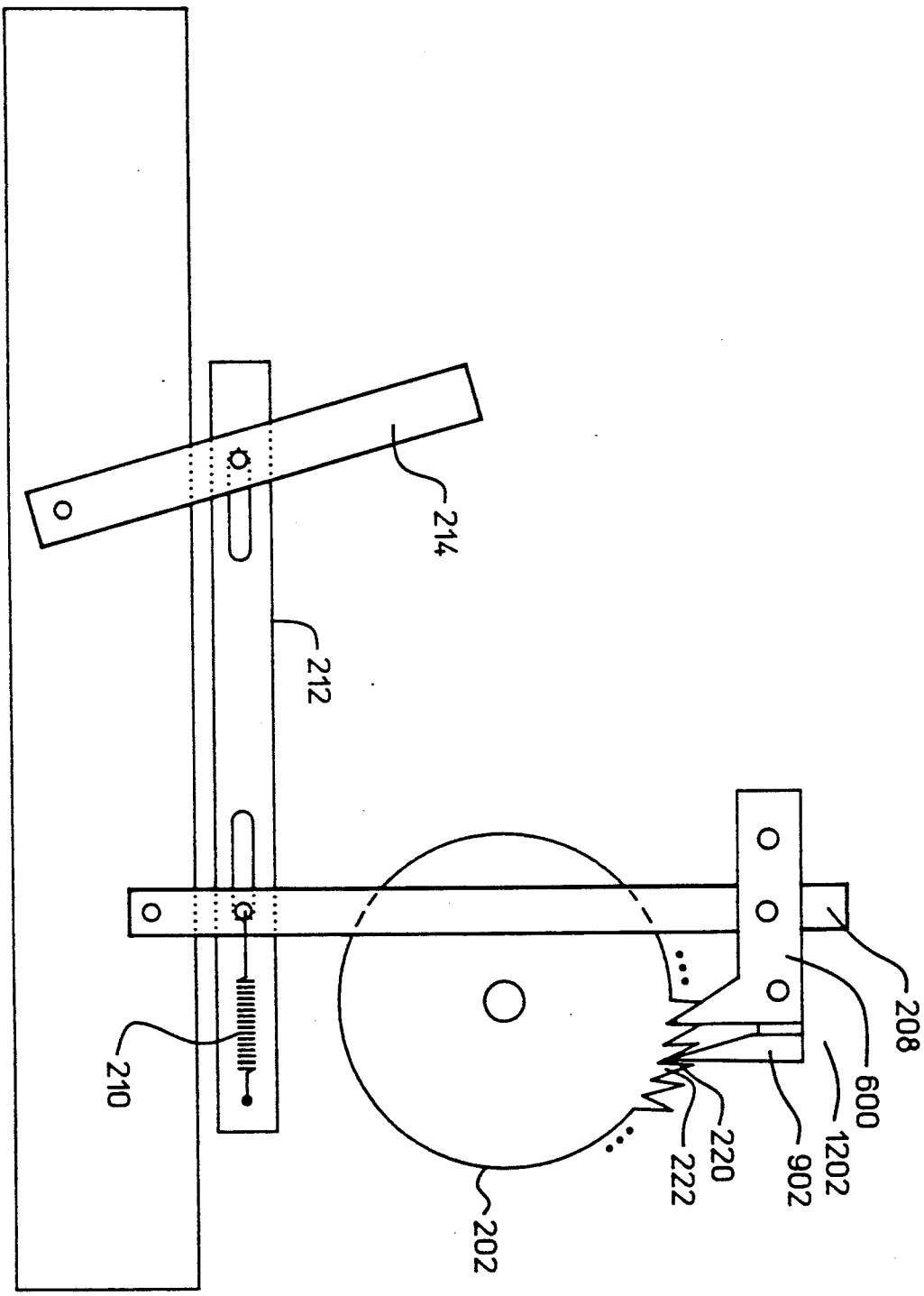

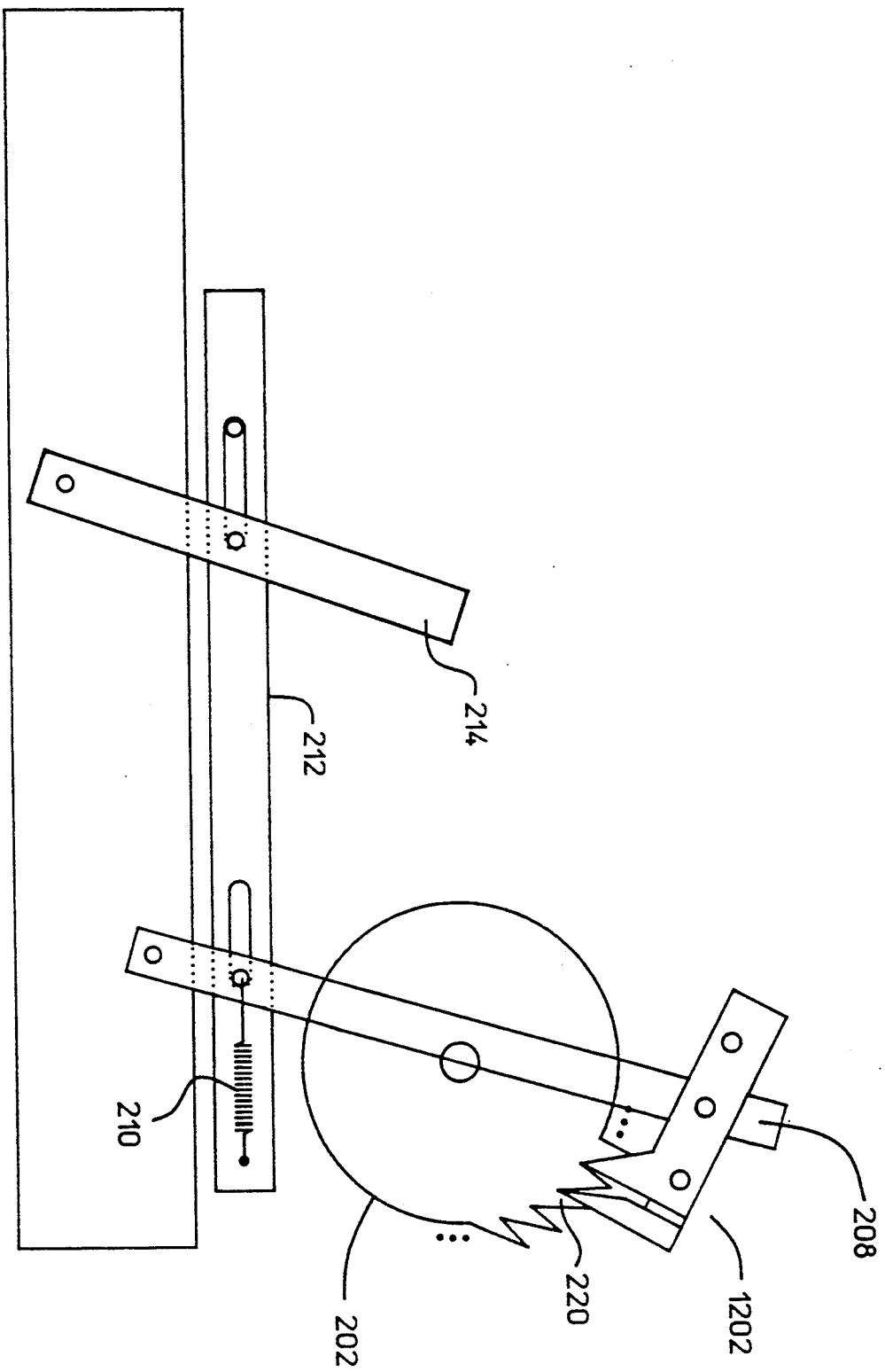

UNDIRECTIONAL RATCHET UTILIZING AN ARTICULATED PAWL

BACKGROUND OF THE INVENTION

This invention relates to a drive system used to rotate a take-up reel on a component feeder. In particular, this invention is manifested in an articulated pawl used to drive teeth on a take-up reel.

Surface mount technology is widely used in the electronics industry today. The need to put ever more components on smaller and smaller circuit boards has driven the industry to develop smaller components and to place them closer together. Many of the electronic components today are too small to be easily handled and placed by hand.

The electronics industry has developed many new machines to handle and place these small components. One such device is a pick-and-place machine. This machine is a robotic device that picks up a component, generally by suction, and places it with great precision at a desired location on a printed circuit board. The components are fed into the pick-and-place machine by a peripheral mechanism known as a feeder.

Components are loaded on the feeder a variety of ways, including on tape-and-reel. In the tape and reel system, components are held inside a tape sandwich. The lower part of the tape typically is composed of pockets, and components are placed in the pockets to isolate the components from each other. A cover layer of tape is applied over the pockets, thereby trapping the components inside the pockets. The tape sandwich, containing the components, is many feet long and is wound around a reel and looks like a lumpy roll of masking tape.

This reel of tape and components is loaded onto the feeder and the feeder strips the top layer of tape off, thereby exposing a component. A pick and place machine picks up the exposed component and places it onto a printed circuit board. The feeder continues to feed components in this manner to the pick-and-place machine as required.

FIG. 1 shows a simplified tape and reel feeder. A reel of tape 102 is unrolled along a support 106. The tape 104 is guided by the support 106 to the initial roller/guide 108. The top layer 110 is stripped off of the tape 104 and wound around a take-up reel 112 by the rotation of the reel 112. After the top layer 110 is removed, a component 114 is exposed on the bottom layer 116 of the tape 104. The take-up reel 112 normally has teeth around the periphery and is driven by a pawl (not shown).

The Fuji IP1 is a typical pick and place machine which uses typical tape and reel feeders used by the electronics industry and operates essentially as shown in FIG. 1. FIG. 2 shows part of the drive system for the Fuji tape take-up reel. The take-up reel 202 has sawtooth-shaped teeth 204 around the periphery. A spring-loaded drive pawl 206 is mounted on a vertical arm 208, which is connected by a spring 210 to a horizontal reciprocating arm 212. A vertical drive bar 214 is in sliding engagement with the horizontal arm 212.

In a retracted position, as shown in FIG. 2, the pawl 206 is held in the most rearward position by the vertical arm 208. The vertical arm 208 is moved into the rearward position by the movement of the reciprocating arm 212 and the drive bar 214. A pneumatic actuator (not shown) drives the vertical drive bar 214 rearward (pawl retracted) and forward (pawl advanced).

As the pawl 206 is retracted from a forward position, it slides over the back side 216 of the saw tooth shaped teeth 204 until the most rearward position is reached. A friction brake (not shown) prevents the take-up reel from moving during the retraction of the pawl 206.

To drive the take-up reel 202, the drive arm 214 is pulled forward, thereby forcing the reciprocating arm 212 forward. As the arm 212 is forced forward, the vertical arm 208 is pulled forward by a spring 210. The forward movement of the arm 208 forces the front edge 218 of the pawl 206 into engagement with the front edge 220 of the tooth 222. As the vertical arm 208 moves forward, the pawl 206 forces the tooth 222 forward, thereby rotating the take-up reel 202.

FIG. 3 shows the pawl 206, arms 208 and 212, and the drive bar 214 in a forward position. The cycle of forward and rearward movement of the drive bar 214 is continued as each new component is presented to the pick and place machine.

The prior art take-up reel system suffers from two main deficiencies. The first deficiency occurs during the retract phase of the drive cycle. The pawl does not always skip the same number of teeth and a difference of up to two teeth between successive retract cycles is common. This is a result of the tip of the pawl coming to rest on the tip of a tooth of the take-up reel, causing the pawl to "bounce" over a tooth rather than coming to rest between teeth as shown in FIG. 4. Because the pawl does not skip the same number of teeth on each retract cycle, the amount of top layer tape stripped off is indeterminate and may not be enough to expose a component fully on the bottom layer of the tape sandwich. If the top layer of tape is not stripped off the component, the pick-and-place machine will misfeed and require operator intervention.

The second deficiency is also manifested during the retraction of the pawl. At the end of some retract cycles, the pawl tip is supported on the top of a tooth, as shown in FIG. 5. As the pawl is driven forward, it does not engage the teeth properly, if at all. While the pawl is spring-loaded such that the tip of the pawl is forced down and into contact with the teeth, the force is insufficient to prevent missed teeth when the pawl is advanced at high speed. The spring force cannot be increased significantly, otherwise as the pawl will not slide over the back side of the teeth on the retract cycle and the reel will be rotated backwards. Hence, the pawl skips teeth during the forward drive cycle.

Because of the unreliability of the pawl design, misfeeds of the pick-and-place machine are common. Every misfeed requires an operator to manually intervene so production can continue. This intervention is inconvenient and expensive. Since a company that uses pick-and-place machines typically has a large number of the feeders, a major redesign, or replacement, of the feeders to fix the pawl misfeed problem would be expensive for the company.

With the above in mind, there exists a need in the electronics industry for a low cost and reliable take-up reel drive mechanism which can be retrofitted onto existing equipment.

SUMMARY OF THE INVENTION

The present invention is manifested in a new and novel pawl design that reliably drives the take-up reel, is easy to retrofit onto existing equipment and is exceptionally low in cost.

The articulated pawl, by always insuring that one or both teeth are always engaged with a tooth of the take-up sprocket, prevents teeth from being skipped at both the end of the retract cycle as well as at the start of the drive cycle. The new pawl is constructed with a longer body, using heavier material, and mounted eccentrically as to use gravity to replace an inconsistent torsion spring of the prior art.

To prevent the pawl from not driving the take-up reel properly if the pawl lands on the top of a tooth, the pawl is provided with an articulated arm. This arm extends from the body by a length of approximately 1.5 teeth. If the pawl body is supported on the top of a tooth, the articulated arm is in tooth engagement, thereby ensuring the proper drive of the take-up reel during the drive phase.

The new pawl is constructed of low cost common materials and is easily retrofitted onto existing tape and reel feeders. This invention solves an expensive and troublesome problem faced by the users of Fuji-style component feeders.

BRIEF DESCRIPTION OF THE DRAWINGS

FIG. 14 shows the articulated pawl in the retracted position.

FIG. 15 shows the articulated pawl in the most forward position.

DETAILED DESCRIPTION OF THE INVENTION

Figure 1:
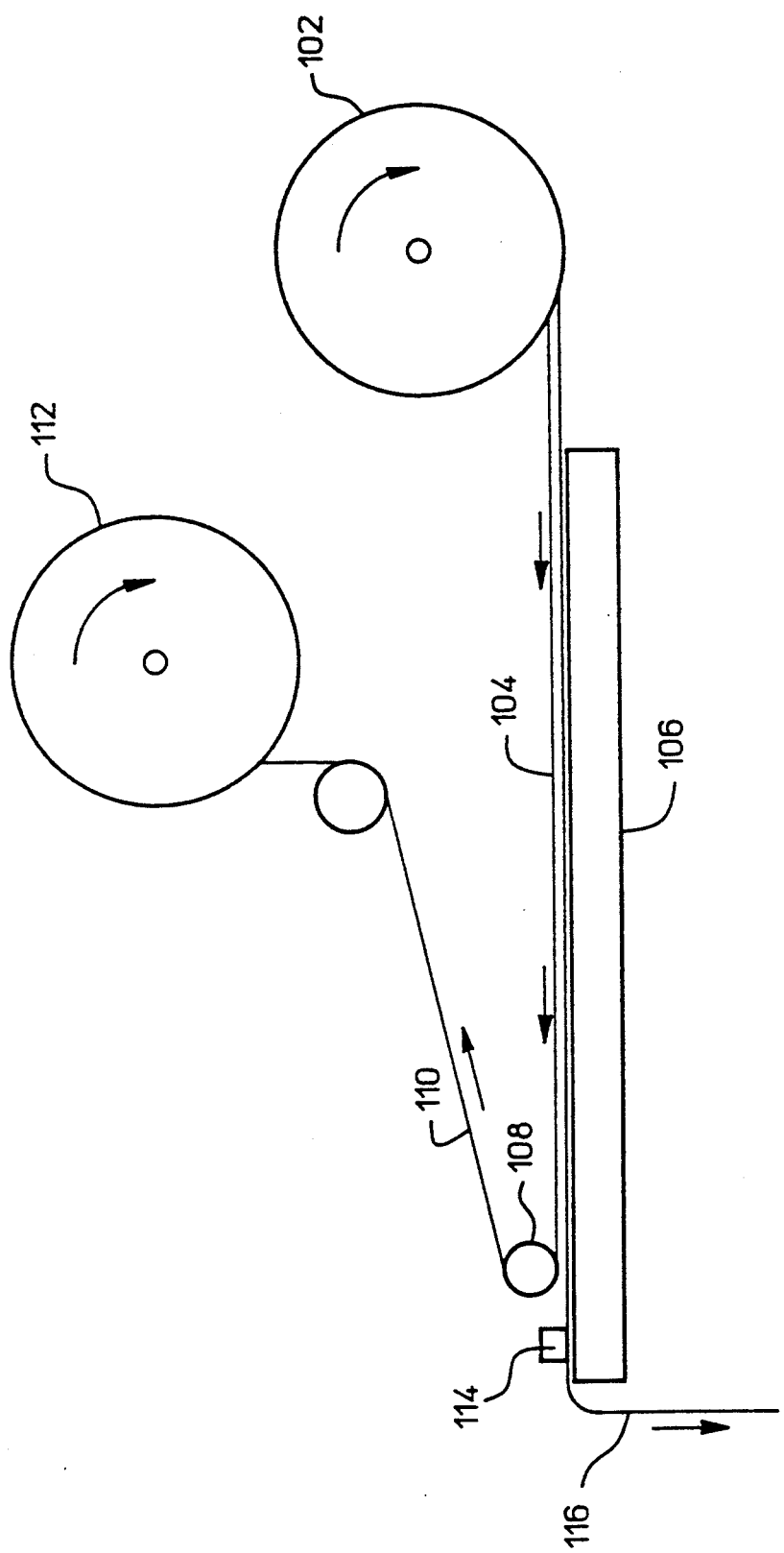
FIG. 1 is a simplified schematic of a tape and reel feeder.
Figure 2:
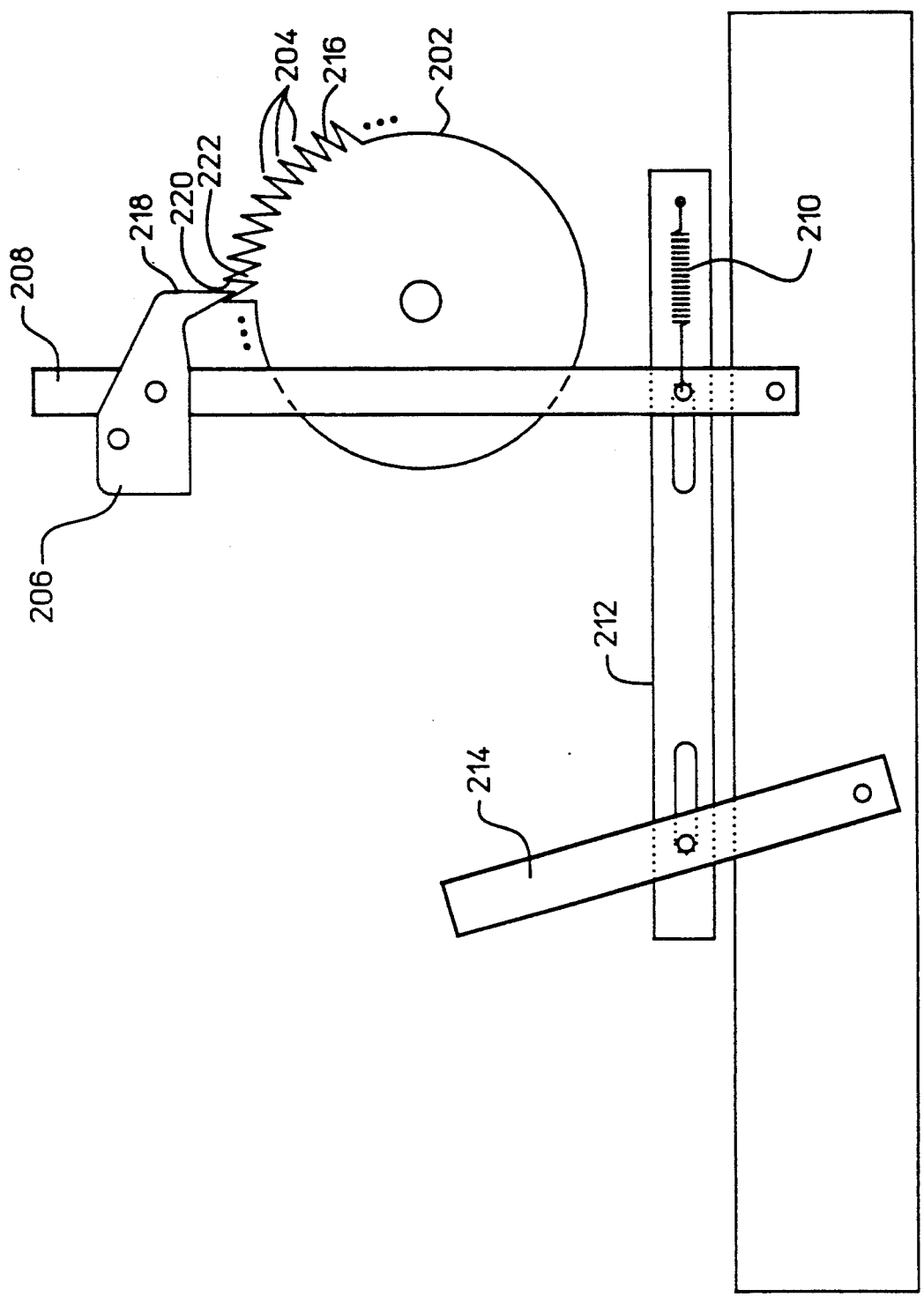
FIG. 2 is a simplified view of a prior art take-up reel drive mechanism in retracted position.
Figure 3:
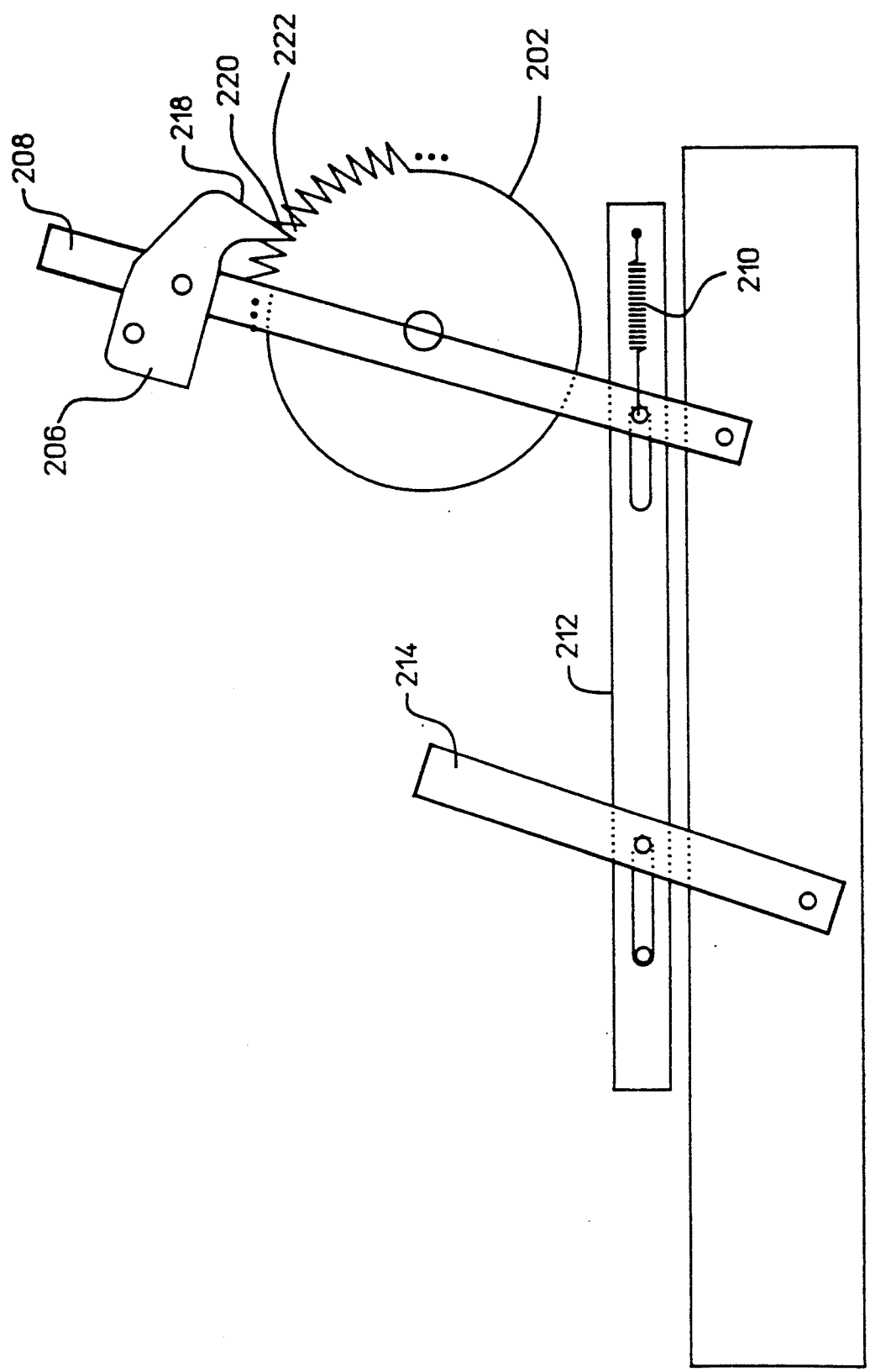
FIG. 3 is a simplified view of a prior art take-up reel drive mechanism in a forward drive position.
Figure 4:
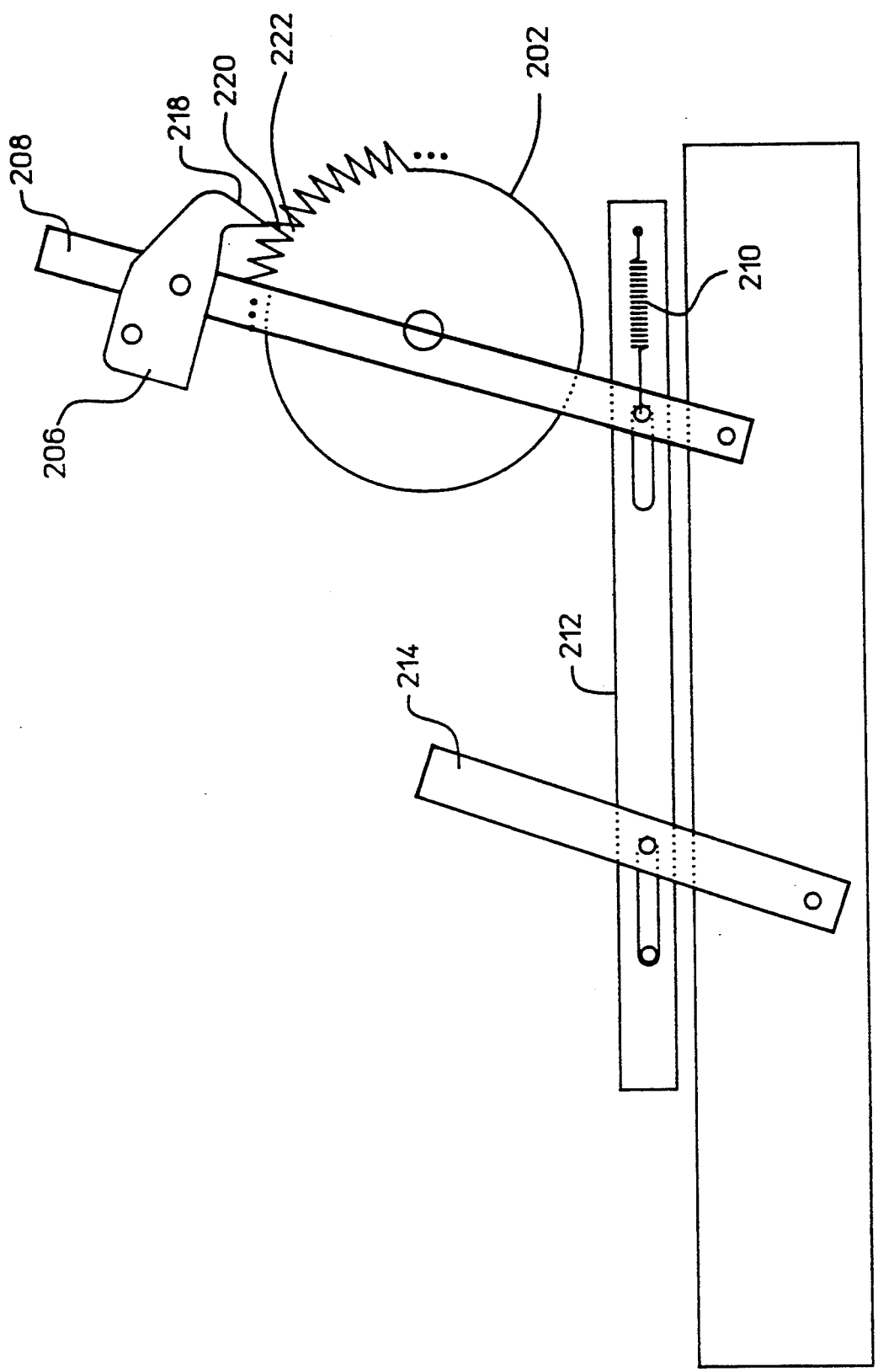
FIG. 4 shows the prior art pawl in the most forward position.
Figure 5:
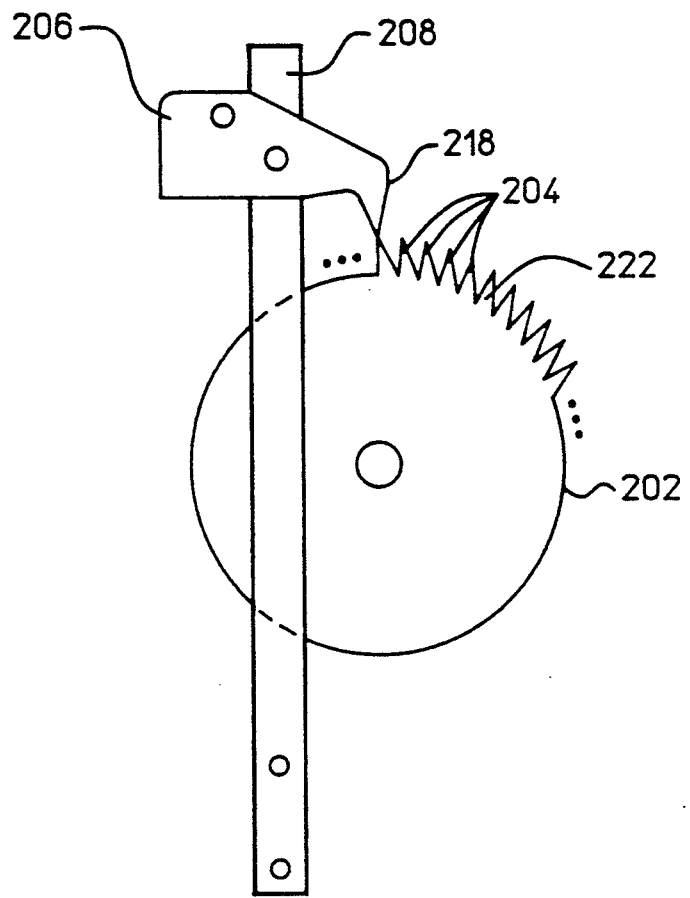
FIG. 5 is a view of the prior art pawl supported on a tooth.
Figure 6:
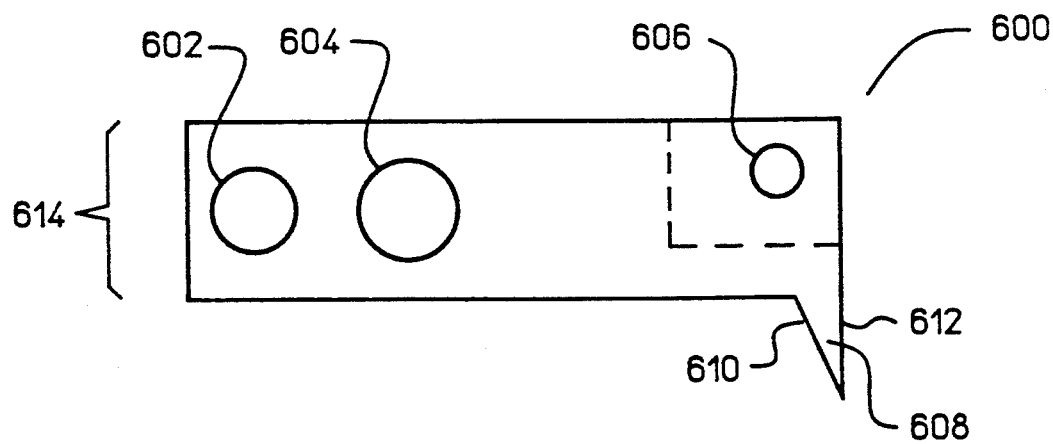
FIG. 6 is a side view of the base of the pawl according to the present invention.
Figure 7:
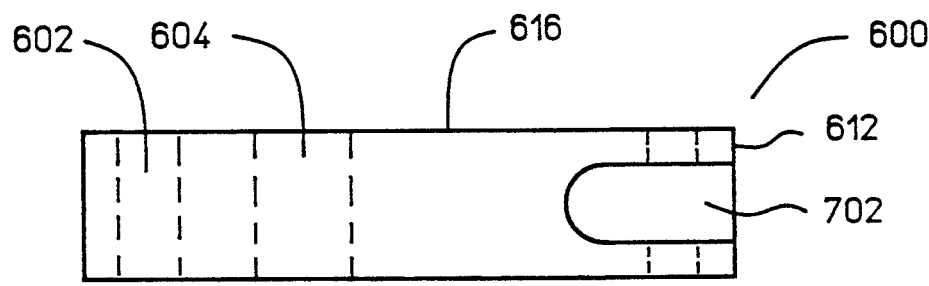
FIG. 7 is a top view of the base of the pawl according to the present invention.
Figure 8:
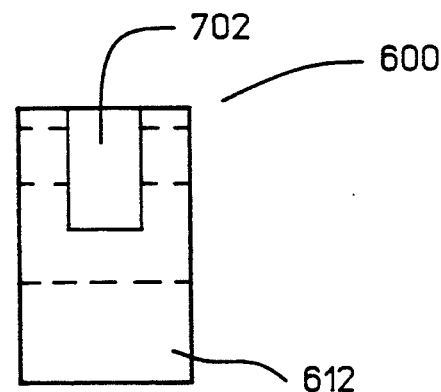
FIG. 8 is a front view of the base of the pawl according to the present invention.

The articulated pawl, according to the present invention, is constructed primarily from brass, although other metals could be used. FIGS. 6, 7, and 8 show the side, top and front views of the pawl base 600. The base 600 is approximately 1.25 inches long by approximately 0.281 inches wide and is approximately 0.52 inches high. In the side of the base 600 are formed three holes, 602, 604, 606 with diameters of approximately 0.125, 0.16 and 0.98 inches respectively. The first hole 602 is centered approximately 0.157 inches from the top surface 616 and approximately 1.145 inches from a front face 612 of the base 600. The second hole 604 is centered approximately 0.157 inches from the top surface 616 and approximately 0.835 inches from the front face 612. The third hole 606 is centered approximately 0.10 inches from the top surface 616 and approximately 0.125 inches from the face 612.

The bottom of the pawl base 600 is cut away to form a tooth 608 with the rear of the tooth 610 having an angle of approximately 25 degrees relative to the front face 612 of the base 600. The tip of tooth projects down from the bottom surface of the base 600 by approximately 0.207 inches. The height of the body 614 is approximately 0.313 inches.

As best shown in FIGS. 7 and 8, a slot 702 is cut into the base 600. The slot 702 is centered in the top of surface of the base 600 and is approximately 0.15 inches wide by 0.22 inches deep and greater than 0.25 inches long.

Figure 9:
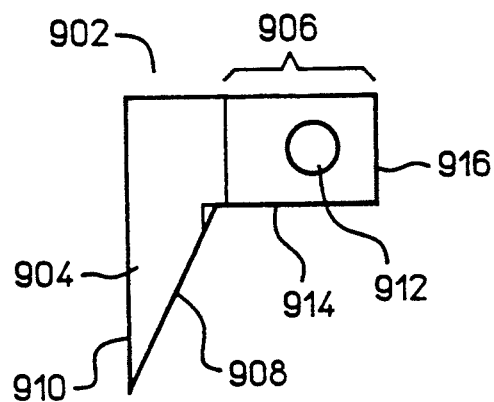
FIG. 9 is a side view of the articulated arm of the pawl according to the present invention.
Figure 10:
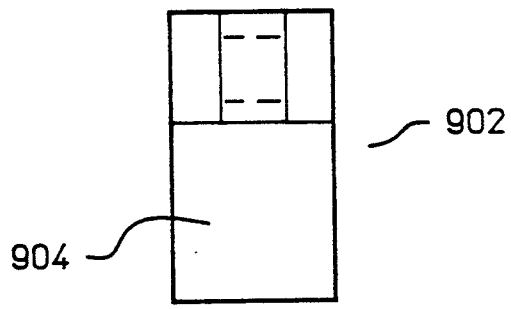
FIG. 10 is a rear view of the articulated arm according to the present invention.
Figure 11:
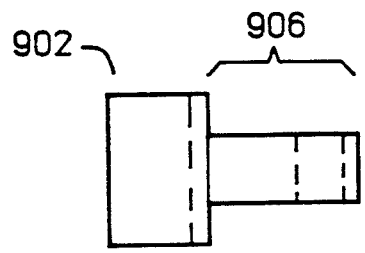
FIG. 11 is a top view of the articulated arm according to the present invention.

FIGS. 9, 10 and 11 show the side, rear and top of the articulated pawl arm. The articulated arm 902 is manufactured from brass and is approximately 0.47 inches long by 0.62 inches high and 0.281 inches wide. The arm 902 is constructed with a tooth 904 and a mounting projection 906. The tooth is approximately 0.62 inches long and the rear 908 of the tooth 904 has an angle of approximately 25 degrees relative to the front face 910. The mounting projection 906 is approximately 0.25 inches long by 0.20 inches high and 0.148 inches wide. A hole 912 with a diameter of approximately 0.0931 inches is formed in the side of the projection 906. This hole 912 is centered approximately 0.10 up from the bottom edge 914 and approximately 0.080 inches from the rear edge 916.

Figure 12:
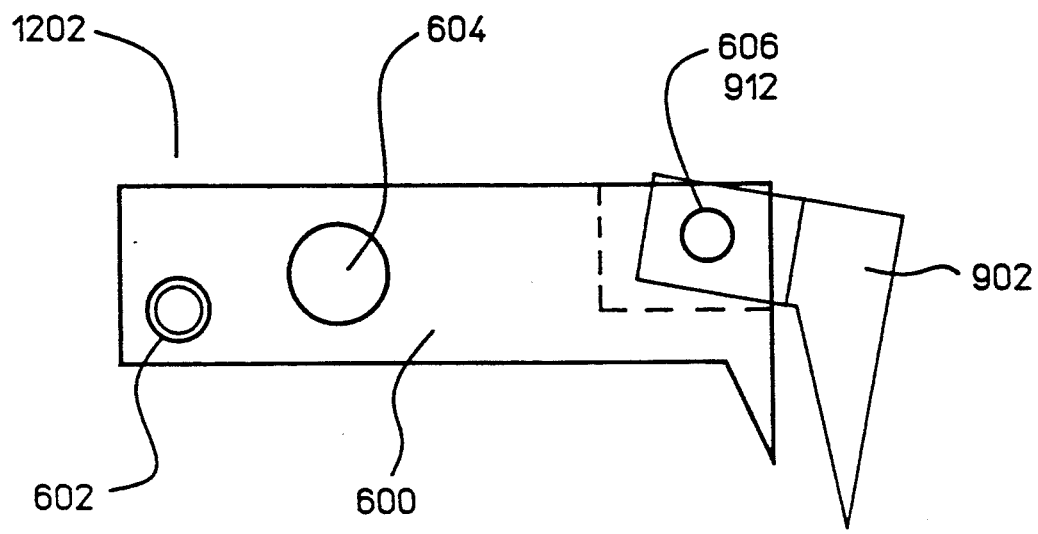
FIG. 12 is a side view of the articulated pawl according to the present invention.
Figure 13:
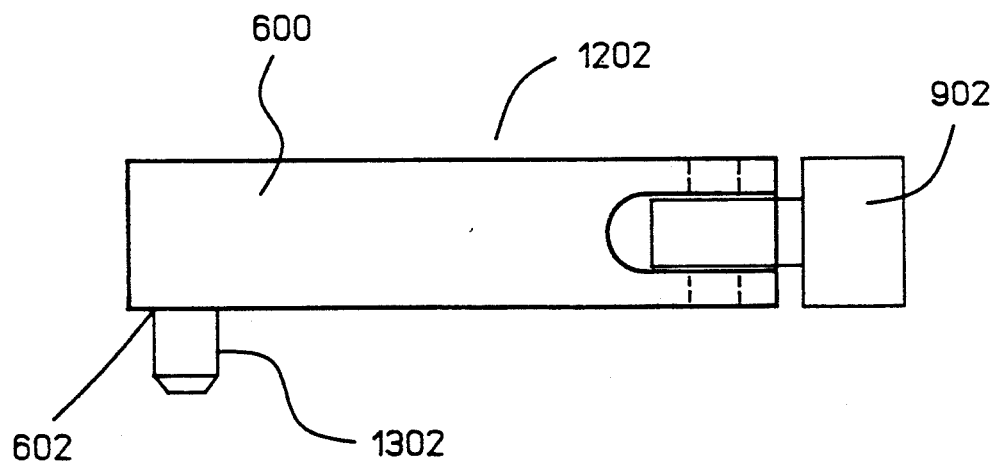
FIG. 13 is a top view of the articulated pawl according to the present invention.

FIGS. 12 and 13 show the assembled articulated pawl 1202. The pawl base 600 and the articulated arm 902 have been joined by the placement of a dowel pin (not shown) through the holes 606 and 912. The dowel is approximately 0.0939 inches in diameter and 0.312 inches long and is pressed through the hole 912.

As best shown in FIG. 13, a limit pin 1302 is pressed into the hole 602. The limit pin 1302 is approximately 0.125 inches in diameter and 0.375 inches long and protrudes out from the base 600 by approximately 0.15 inches.

FIG. 14 shows the take-up reel drive system, incorporating the pawl according to the present invention, in the retracted or starting location. The pawl 1202 is mounted on the vertical arm 208 using the typical screw and nut (not shown) found in the prior art pawl. The prior art pawl biasing spring (not shown) is eliminated as the articulated pawl is gravity actuated.

When being retracted, the pawl base 600 and the articulated arm 902 are free to ride over the back of the teeth 220. Since the articulated arm 902 projects from the pawl base by approximately 1.5 times the spacing of the teeth 220, either the tooth on the pawl base 600 or the articulated arm 902 is in engagement with one of the teeth 220. Therefore, if the tooth of the pawl base 600 is supported by the top of a tooth 220, the pawl 1202 will still drive the reel 202 since the articulated arm 902 will engage and drive a tooth 220.

FIG. 15 shows the take-up reel drive system in the most forward position. In the most forward position, the pawl 1202 is in contact with a tooth 220 of the reel 202. Since the pawl 1202 is always in contact with a tooth 220, the pawl will not skip teeth during the retract phase of the drive cycle.

By staying in tooth contact and having an articulated arm, the pawl 1202 will consistently drive the reel 202 the proper amount. In experimental testing, the reel 202 drive system was actuated 48,353 times. The prior art pawl turned the reel 5626 revolutions while the pawl 1202 turned the reel 5973 revolutions.

The present invention solves a significant and expensive problem for the users of Fuji feeders, and while this invention has been described with reference to its presently preferred embodiment it is not limited thereto. The scope of the present invention is limited only insofar as defined by the following set of claims and includes all equivalents thereof.

We claim:

1. A unidirectional ratchet component feeder comprising:

a rotatable take-up reel having teeth around the periphery;

an articulated pawl, including a pawl base having a pawl tooth and an articulated arm mounted on the pawl base having a pawl tooth, mounted on a first arm such that one of the two pawl teeth is in contact with the teeth of the take-up reel;

a reciprocating arm coupled to the first arm;

a drive bar in sliding engagement with the reciprocating arm;

a means for moving the drive bar such that the drive bar causes the reciprocating arm to move and thereby causes the first arm to push the pawl forward against a tooth of the take-up reel such that the take-up reel is caused to rotate;

a means for moving the drive bar such that the drive bar causes the reciprocating arm to move and thereby causes the first arm to pull the pawl backwards over the teeth of the take-up reel and not causing the take-up reel to rotate; and the articulated pawl is constructed and mounted such that one of the two pawl teeth is in contact with a tooth of the take-up reel during operation of the take-up reel.

* * * * *